(12) United States Patent
Egawa

(10) Patent No.: US 8,070,299 B2
(45) Date of Patent: Dec. 6, 2011

(54) LIGHT SOURCE APPARATUS AND PROJECTOR HAVING A WAVELENGTH SEPARATOR

(75) Inventor: Akira Egawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 539 days.

(21) Appl. No.: 11/970,999

(22) Filed: Jan. 8, 2008

(65) Prior Publication Data
US 2008/0170207 A1    Jul. 17, 2008

(30) Foreign Application Priority Data
Jan. 16, 2007    (JP) ................... 2007-006677

(51) Int. Cl.
*G03B 21/28* (2006.01)
*H01S 3/10* (2006.01)
*G02F 1/35* (2006.01)
(52) U.S. Cl. ............................. 353/81; 372/22; 359/328
(58) Field of Classification Search .................... 353/81, 353/84; 372/21, 22, 23; 362/293; 359/328
See application file for complete search history.

(56) References Cited

U.S. PATENT DOCUMENTS

| | | | | |
|---|---|---|---|---|
| 5,452,312 A | * | 9/1995 | Yamamoto et al. | 372/5 |
| 5,671,232 A | * | 9/1997 | Lee et al. | 372/22 |
| 6,049,555 A | * | 4/2000 | Ohtsuka et al. | 372/34 |
| 6,764,183 B2 | * | 7/2004 | Okazaki | 353/31 |
| 2004/0227998 A1 | * | 11/2004 | Aoshima et al. | 359/641 |
| 2006/0023173 A1 | | 2/2006 | Mooradian et al. | |
| 2006/0023757 A1 | | 2/2006 | Mooradian et al. | |
| 2006/0268241 A1 | | 11/2006 | Watson et al. | |
| 2006/0280219 A1 | | 12/2006 | Shchegrov | |
| 2007/0153862 A1 | | 7/2007 | Shchegrov et al. | |
| 2007/0153866 A1 | | 7/2007 | Shchegrov et al. | |

FOREIGN PATENT DOCUMENTS

| | | |
|---|---|---|
| JP | A 3-15832 | 1/1991 |
| JP | A-05-235441 | 9/1993 |
| JP | 2004088129 A * | 3/2004 |
| JP | A 2006-19603 | 1/2006 |

OTHER PUBLICATIONS

Adam Mooradian et al.; "High Power Extended Vertical Cavity Surface Emitting Diode Lasers and Arrays and Their Applications"; Micro-Optics Conference, Tokyo; Nov. 2, 2005.

* cited by examiner

*Primary Examiner* — Thanh X Luu
(74) *Attorney, Agent, or Firm* — Oliff & Berridge, PLC

(57) ABSTRACT

A light source apparatus includes a light source unit that supplies light having a first wavelength, a wavelength conversion element that converts the light having the first wavelength into the light having a second wavelength different from the first wavelength, and a wavelength separator that separates the first-wavelength light from the second-wavelength light. The wavelength separator directs the second-wavelength light from the wavelength conversion element in the exit direction and the first-wavelength light from the wavelength conversion element in a direction other than the exit direction.

9 Claims, 3 Drawing Sheets

LIGHT SOURCE APPARATUS AND PROJECTOR HAVING A WAVELENGTH SEPARATOR

BACKGROUND

1. Technical Field

The present invention relates to a light source apparatus and a projector, and particularly to a technology for a light source apparatus used in a projector.

2. Related Art

In the field of a light source apparatus for a projector, there has been recently proposed a technology using a laser light source that supplies laser light. A light source apparatus using a laser light source, as compared to a UHP lamp currently used as the light source apparatus for a projector, has various advantages including excellent color reproducibility, quick start, and a long life. Known examples of the light source apparatus using a laser light source include the one that directly supplies fundamental wave laser light from a laser light source and the one that supplies wavelength-converted fundamental wave laser light. As a wavelength conversion element that converts the wavelength of the fundamental wave laser light, for example, a second-harmonic generation (SHG) element is known. Use of a wavelength conversion element along with a general-purpose laser light source easily available allows laser light having a desired wavelength to be supplied. It is also possible to employ a configuration capable of supplying a sufficient amount of laser light. There is a known light source apparatus using an SHG element configured in such a way that the SHG element is disposed in a resonator structure in which the laser light resonates (see JP-A-5-235441, for example). Among the fundamental wave laser light resonating in the resonator structure, extracting laser light having a desired converted wavelength allows laser light to be supplied at high wavelength conversion efficiency.

The resonator structure includes a wavelength selective mirror that reflects the fundamental wave laser light. It is difficult even for a wavelength selective mirror to reflect all fundamental wave laser light, but part of the fundamental wave laser light disadvantageously passes through the mirror. In the configuration proposed in JP-A-5-235441, the fundamental wave laser light that exits from the resonator structure directly leaks out of the light source apparatus. Intense laser light may cause uncomfortable feeling in the human body, particularly in the eyes. A laser light-based apparatus needs to be configured to reliably avoid laser light-related troubles.

A light source apparatus for a projector is, in general, configured to use an SHG element to convert infrared light, which is the fundamental wave laser light, into visible light. It is difficult for the eyes to respond and avoid infrared light compared to visible light. It is therefore necessary to reliably prevent leakage of infrared light, particularly when it is intense. To prevent the leakage of infrared light, it is conceivable to use an infrared light blocking glass member that absorbs infrared light. In the configuration using an infrared light blocking glass member, however, a broken part of the infrared light blocking glass member easily causes the leakage of infrared light to the outside. The related art thus poses a problem of difficulty reliably preventing troubles from occurring in the configuration capable of achieving high wavelength conversion efficiency.

SUMMARY

An advantage of some aspects of the invention is to provide a light source apparatus capable of reliably preventing troubles from occurring in the configuration capable of achieving high wavelength conversion efficiency as well as a projector using such a light source apparatus.

A light source apparatus according to an aspect of the invention includes a light source unit that supplies light having a first wavelength, a wavelength conversion element that converts the light having the first wavelength into the light having a second wavelength different from the first wavelength, and a wavelength separator that separates the first-wavelength light from the second-wavelength light. The wavelength separator directs the second-wavelength light from the wavelength conversion element in the exit direction and the first-wavelength light from the wavelength conversion element in a direction other than the exit direction.

By employing the configuration in which only the light from the wavelength separator traveling in the exit direction exits out of the light source apparatus, it is possible to reliably avoid the situation in which the first-wavelength light from the wavelength separator traveling in a direction other than the exit direction directly exits out of the light source apparatus. Further, for example, in the configuration using an infrared light blocking glass member, it is possible to prevent the first-wavelength light from directly exiting to the outside even when the infrared light blocking glass member is broken. There is thus provided a light source apparatus capable of reliably preventing troubles from occurring in the configuration capable of achieving high wavelength conversion efficiency.

It is preferable that the wavelength separator desirably allows the first-wavelength light to pass through in a direction other than the exit direction, and reflects the second-wavelength light in the exit direction. By employing the configuration in which the reflection at the wavelength separator converts the traveling direction of the second-wavelength light into the exit direction, it is possible to prevent the first-wavelength light from directly exiting to the outside even when the wavelength separator is broken.

It is preferable that the light source apparatus desirably further includes a housing that houses the light source unit, the wavelength conversion element, and the wavelength separator, and the housing desirably absorbs the first-wavelength light at the position where the light from the wavelength separator traveling in a direction other than the exit direction impinges on the housing. By configuring the housing to absorb the first-wavelength light from the wavelength separator, it is possible to prevent the first-wavelength light from scattering in the housing. It is thus possible to reduce the amount of the scattered first-wavelength light traveling toward the exit.

It is preferable that the light source apparatus desirably further includes an exit through which the light from the wavelength separator traveling in the exit direction exits out of the housing, and a light blocker provided around the exit, the light blocker blocking the light other than that from the wavelength separator traveling in the exit direction. By providing the light blocker, it is possible to block the first-wavelength light traveling in a direction other than the exit direction and then scattered and directed toward the exit. It is thus possible to further reduce the amount of the first-wavelength light that is scattered in the housing and then exits through the exit.

It is preferable that the housing desirably has a recess provided at the position where the light from the wavelength separator traveling in a direction other than the exit direction impinges on the housing. Provision of the recess allows reduction in the amount of scattered first-wavelength light. It is thus possible to further reduce the amount of the first-wavelength light that exits through the exit.

It is preferable that the light source unit desirably supplies infrared light, which is the first-wavelength light, and the light source apparatus desirably further includes an infrared light reduction member provided at the position where the light from the wavelength separator traveling in the exit direction impinges on the housing, the infrared light reduction member reducing infrared light transmission. It is thus possible to reduce the amount of the infrared light that exits through the exit.

It is preferable that the light source apparatus desirably further includes a resonator structure in which the first-wavelength light resonates along the light path including the wavelength conversion element, and the wavelength separator is desirably disposed on the exit side of the resonator structure. The resonator structure allows the light having a desired wavelength to be efficiently emitted. Provision of the wavelength separator on the exit side of the resonator structure can prevent the first-wavelength light emitted from the resonator structure from directly exiting to the outside.

A projector according to another aspect of the invention includes the light source apparatus described above and a spatial light modulation device that modulates the light from the light source apparatus according to an image signal. The use of the light source apparatus described above can reliably prevent troubles from occurring in the configuration capable of achieving high wavelength conversion efficiency. There is thus provided a projector capable of reliably preventing troubles from occurring in the configuration capable of displaying a bright image.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described below in detail with reference to the drawings.

First Embodiment

Figure 1:
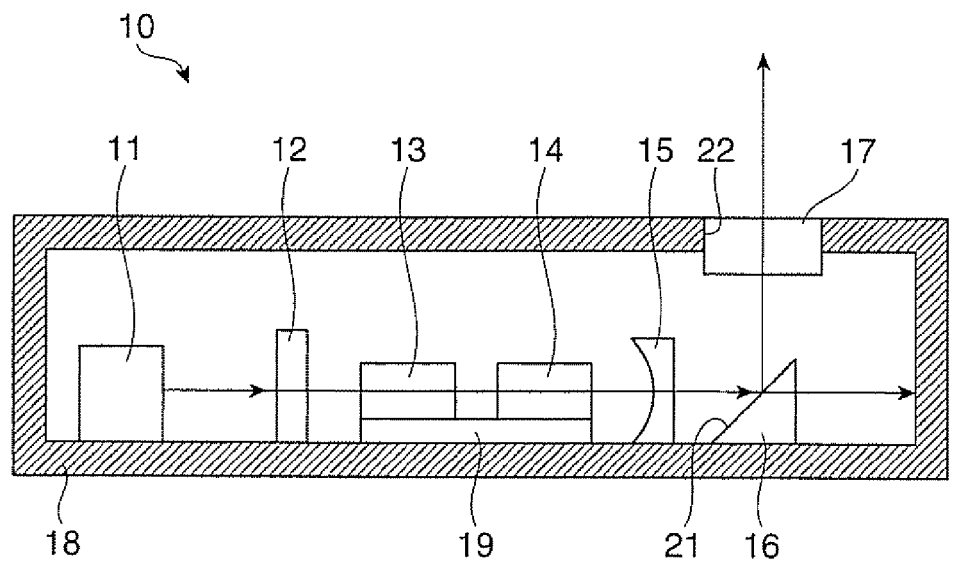
FIG. 1 shows a schematic configuration of the light source apparatus according to a first embodiment of the invention.

FIG. 1 shows a schematic configuration of the light source apparatus 10 according to a first embodiment of the invention. The light source apparatus 10 is a diode pumped solid state (DPSS) laser oscillator. An excitation laser 11 is a semiconductor laser that supplies laser light having a wavelength of, for example, 808 nm. A first resonance mirror 12 is provided on the exit side of the excitation laser 11. The laser light from the excitation laser 11 passes through the first resonance mirror 12 and then enters a laser crystal 13. The laser crystal 13 is excited so that laser oscillation occurs therein and laser light having a first wavelength is supplied. Examples of the laser crystal 13 may be Nd:YVO$_4$ crystal and Nd:YAG (Y$_3$Al$_5$O$_{12}$) crystal. The excitation laser 11 and the laser crystal 13 form a light source unit that supplies infrared laser light having the first wavelength. The first wavelength is, for example, 1064 nm.

An SHG element 14 is a wavelength conversion element that converts the first-wavelength laser light from the laser crystal 13 into laser light having a second wavelength different from the first wavelength. The second wavelength is half the first wavelength, for example, 532 nm. An example of the SHG element 14 may be a nonlinear optical crystal. A second resonance mirror 15 is provided between the SHG element 14 and a dichroic mirror 16. The second resonance mirror 15 has a function of selectively reflecting the first-wavelength laser light while transmitting the light other than the first-wavelength light (including the second-wavelength light). The laser light that has passed through the second resonance mirror 15 travels toward the dichroic mirror 16. The laser light reflected off the second resonance mirror 15 travels toward the SHG element 14.

The first resonance mirror 12, as in the second resonance mirror 15, selectively reflects the first-wavelength laser light and transmits the light other than the first-wavelength light. The first and second resonance mirrors 12 and 15 form a resonator structure in which the first-wavelength light resonates along the light path including the SHG element 14. The laser light converted into the second-wavelength light between the first and second resonance mirrors 12 and 15 travels through the second resonance mirror 15 toward the dichroic mirror 16. The resonator structure thus allows laser light having a desired wavelength to be efficiently emitted.

The dichroic mirror 16 is a wavelength separator that separates the first-wavelength light from the second-wavelength light in such a way that the first-wavelength light passes through the dichroic mirror 16 and the second-wavelength light is reflected off the dichroic mirror 16. The dichroic mirror 16 is a rectangular prism made of a transparent material, such as glass, having a wavelength selective film, such as a dielectric multilayer film, formed on the inclined surface 21. The dichroic mirror 16 is disposed in such a way that the inclined surface 21 is inclined to the incident light ray by approximately 45 degrees. The dichroic mirror 16 is disposed on the exit side of the resonator structure formed of the first and second resonance mirrors 12 and 15.

The second-wavelength laser light incident on the dichroic mirror 16 is reflected off the inclined surface 21, so that the light path is bent by approximately 90 degrees. The second-wavelength laser light, the light path of which has been bent at the dichroic mirror 16, travels in the exit direction. The first-wavelength light incident on the dichroic mirror 16 travels straight through the inclined surface 21 and the rectangular prism. In this way, the dichroic mirror 16 allows the first-wavelength laser light to pass through in a direction other than the exit direction, and reflects the second-wavelength laser light in the exit direction. The dichroic mirror 16 is not necessarily formed of a rectangular prism, but may be formed of a plane-parallel plate made of glass or the like.

An opening 22 is provided in a housing 18 at the position where the second-wavelength laser light reflected off the dichroic mirror 16 impinges on the housing 18. The opening 22 is an exit though which the laser light coming from the dichroic mirror 16 in the exit direction exits to the outside. An IR blocking glass member 17 is provided to completely block the opening 22. The second-wavelength laser light incident on the IR blocking glass member 17 passes therethrough and exits out of the housing 18.

The IR blocking glass member 17 is a substrate formed of an $SiO_2$-containing glass member and has an IR blocking film coated on the glass plate. The IR blocking glass member 17 is an infrared reduction member that absorbs infrared light and hence reduces infrared transmission. Provision of the IR blocking glass member 17 in the opening 22 allows reduction in the amount of exiting first-wavelength laser light, which is infrared light. The IR blocking glass member 17 does not necessarily have an IR blocking film, but may have an infrared absorbing material added to the glass composition.

The housing 18 hermetically houses various components provided along the light path extending from the excitation laser 11 to the dichroic mirror 16. The components, the excitation laser 11 through the dichroic mirror 16, are aligned with respect to one another in the housing 18. For example, the laser crystal 13 and the SHG element 14 are disposed on a common mounting plate 19, so that they are aligned with the other components. The components other than the laser crystal 13 and the SHG element 14 may be aligned with respect to one another by using the mounting plate 19.

The first-wavelength laser light that has traveled through the dichroic mirror 16 in a direction other than the exit direction impinges on the housing 18. The housing 18 absorbs the first-wavelength laser light at the position where the laser light that has traveled through the dichroic mirror 16 in a direction other than the exit direction impinges on the housing 18. By configuring the housing 18 to absorb the laser light that has traveled through the dichroic mirror 16 in a direction other than the exit direction, it is possible to prevent the first-wavelength laser light from scattering in the housing 18. Preventing the laser light from scattering allows reduction in the amount of the first-wavelength laser light traveling toward the opening 22. Even when the amount of the first-wavelength laser light absorbed in the housing 18 is insufficient, the IR blocking glass member 17 can reduce the amount of exiting first-wavelength laser light reflected off the housing 18.

By employing the configuration in which the reflection at the dichroic mirror 16 converts the traveling direction of the second-wavelength laser light into the exit direction, it is possible to prevent the first-wavelength laser light from directly exiting to the outside even when the dichroic mirror 16 and/or the IR blocking glass member 17 is broken. This configuration provides an advantage of reliably preventing troubles from occurring in the configuration capable of achieving high wavelength conversion efficiency. The light source apparatus of the invention does not necessarily use the DPSS laser oscillator, but may allow the laser light from a semiconductor laser, which is the light source unit, to be incident on the wavelength conversion element. In this case, the light source unit may be a semiconductor laser, or may be a solid state laser, a liquid laser, a gas laser or the like.

Figure 2:
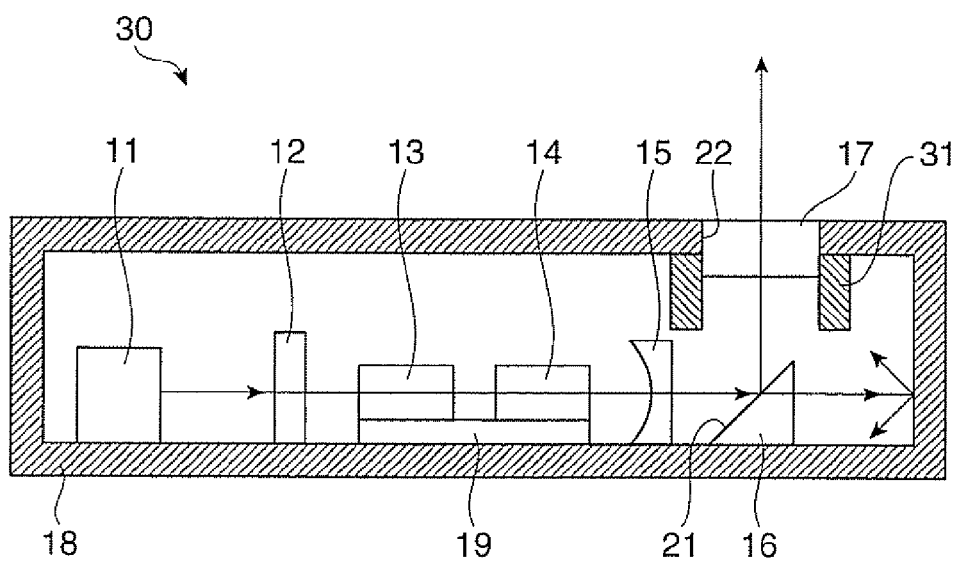
FIG. 2 shows a schematic configuration of the light source apparatus according to a first variation of the first embodiment.

FIG. 2 shows a schematic configuration of the light source apparatus 30 according to a first variation of this embodiment. The light source apparatus 30 of this variation features a light blocker 31. The light blocker 31 is provided around the opening 22 in the housing 18. The second-wavelength laser light coming from the dichroic mirror 16 in the exit direction will not be blocked by the light blocker 31 but exits through the IR blocking glass member 17 to the outside. The first-wavelength laser light traveling through the dichroic mirror 16 in a direction other than the exit direction and reflected off the housing 18 will be scattered in the housing 18. Among the laser light scattered in the housing 18, the components traveling toward the opening 22 are blocked by the light blocker 31.

The light blocker 31 thus blocks the laser light other than that from the dichroic mirror 16 traveling in the exit direction. Even when the amount of the first-wavelength laser light absorbed in the housing 18 is insufficient, the provision of the light blocker 31 can reduce the amount of exiting first-wavelength laser light. The amount of the first-wavelength laser light scattered in the housing 18 and then exiting through the exit can thus further be reduced.

Figure 3:
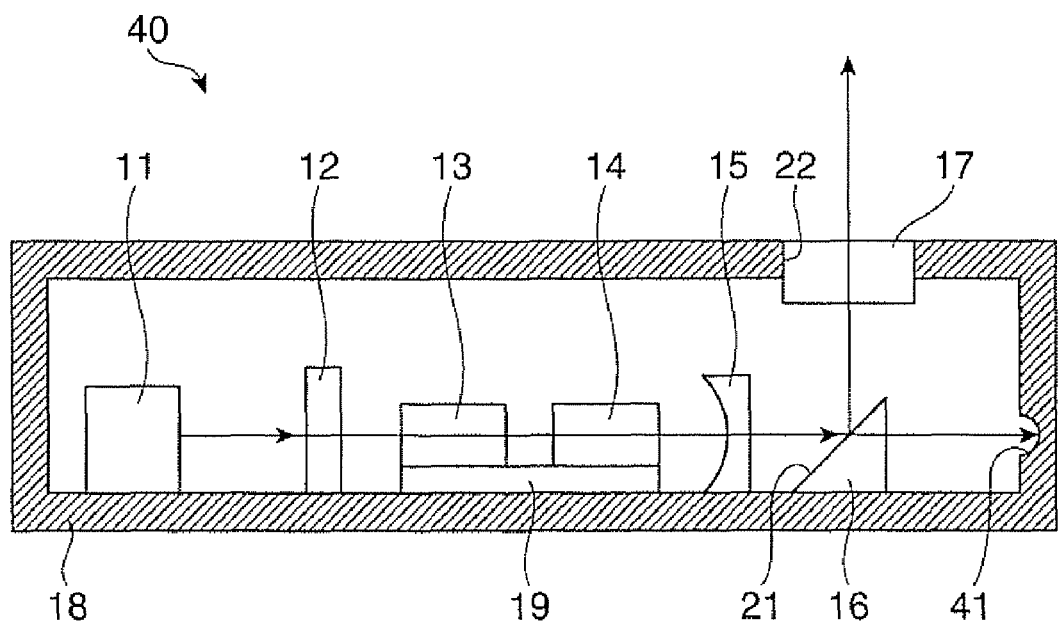
FIG. 3 shows a schematic configuration of the light source apparatus according to a second variation of the first embodiment.

FIG. 3 shows a schematic configuration of the light source apparatus 40 according to a second variation of this embodiment. The light source apparatus 40 of this variation features a recess 41 provided in the housing 18. The recess 41 is provided in the housing 18 at the position where the first-wavelength laser light traveling through the dichroic mirror 16 impinges on the housing 18. The cross-sectional shape of the recess 41 is part of a circle, for example, a semicircle. The formation of the recess 41 allows further reduction in the amount of reflection of the first-wavelength laser light that impinges on the recess 41. The reduction in the amount of scattered first-wavelength laser light allows further reduction in the amount of first-wavelength laser light exiting through the exit. The shape of the recess 41 is not limited to the one illustrated, but may be any of other shapes as long as they can reduce the amount of first-wavelength laser light traveling through the dichroic mirror 16 and scattered.

Second Embodiment

Figure 4:
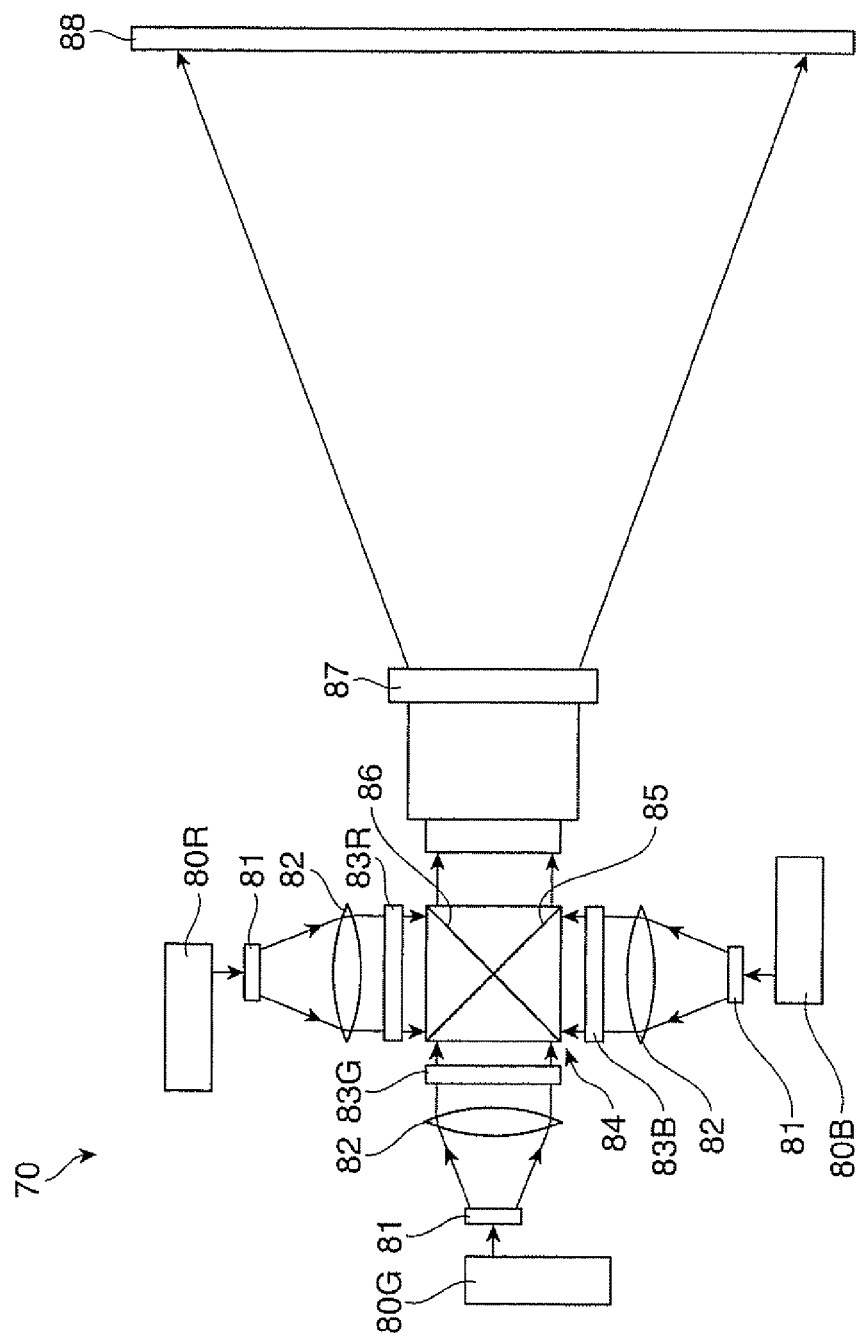
FIG. 4 shows a schematic configuration of the projector according to a second embodiment of the invention.

FIG. 4 shows a schematic configuration of the projector 70 according to a second embodiment of the invention. The projector 70 is a front-projection projector, which supplies light onto a screen 88 and presents an image to the viewer who observes the light reflected off the screen 88. Redundant description that has been already made in the first embodiment will be omitted. The projector 7a includes a light source apparatus for red (R) light 80R, a light source apparatus for green (G) light 80G, and a light source apparatus for blue (B) light 80B. Each of the color light source apparatuses 80R, 80G, and 80B has the same configuration as that of the light source apparatus in the first embodiment. The projector 70 uses the light from each of the color light source apparatuses 80R, 80G, and 80B to display an image.

The light source apparatus for R light 80R is a light source apparatus that supplies R light. A diffuser element 81 shapes and enlarges the illumination area and makes the laser light intensity distribution uniform. An example of the diffuser element 81 may be a computer generated hologram (CGH), which is a diffraction optical element. A field lens 82 collimates the laser light from the diffuser element 81 and transmits the collimated laser light to a spatial light modulation device for R light 83R. The spatial light modulation device for R light 83R is a spatial light modulation device that modulates the R light according to an image signal. Specifically, the spatial light modulation device for R light 83R is a transmissive liquid crystal display device. The R light modulated by the spatial light modulation device for R light 83R is incident on a cross dichroic prism 84, which is a color composition optical element.

The light source apparatus for G light 80G is a light source apparatus that supplies G light. The laser light that has passed through the diffuser element 81 and the field lens 82 is incident on a spatial light modulation device for G light 83G. The spatial light modulation device for G light 83G is a spatial light modulation device that modulates the G light according to the image signal. Specifically, the spatial light modulation device for G light 83G is a transmissive liquid crystal display device. The G light modulated by the spatial light modulation device for G light 83G is incident on a side of the cross dichroic prism 84 that is different from the side on which the R light is incident.

The light source apparatus for B light 80B is a light source apparatus that supplies B light. The laser light that has passed through the diffuser element 81 and the field lens 82 is incident on a spatial light modulation device for B light 83B. The spatial light modulation device for B light 83B is a spatial light modulation device that modulates the B light according to the image signal. Specifically, the spatial light modulation device for B light 83B is a transmissive liquid crystal display device. The B light modulated by the spatial light modulation device for B light 83B is incident on a side of the cross dichroic prism 84 that is different from the sides on which the R light and the G light are incident. An example of the transmissive liquid crystal display device may be a high temperature polysilicon (HTPS) TFT liquid crystal panel.

The cross dichroic prism 84 has two dichroic films 85 and 86 arranged substantially perpendicular to each other. The first dichroic film 85 reflects the R light and transmits the G and B light. The second dichroic film 86 reflects the B light and transmits the R and G light, The cross dichroic prism 84 combines the R, G, and B light incident from different directions and directs the combined light toward a projection lens 87. The projection lens 87 projects the light combined in the cross dichroic prism 84 toward the screen 88.

By using the color light source apparatuses 80R, 80G, and 80B, each having the same configuration as that in the first embodiment, it is possible to reliably prevent troubles from occurring in the configuration capable of achieving high wavelength conversion efficiency. There is thus provided an advantage of reliably preventing troubles from occurring in the configuration capable of displaying a bright image. The projector 70 does not necessarily employ transmissive liquid crystal display devices as the spatial light modulation devices. Examples of the spatial light modulation device may include a liquid crystal on silicon (LCOS), a DMD (Digital Micromirror Device), and a GLV (Grating Light Valve).

The projector 70 is not necessarily configured to have a spatial light modulation device for each color. The projector 70 may be configured to have one spatial light modulation device that modulates two, three or more color light beams. The projector may be a so-called rear projector, which supplies light onto one side of the screen and presents an image to the viewer who observes the light that exits through the other side of the screen. Further, the light source apparatus of the invention may be applied not only to a projector, but also, for example, to an exposure apparatus using laser light for exposure and a monitoring apparatus that monitors an image illuminated by laser light. Moreover, the light source apparatus of the invention does not necessarily use a laser light source as the light source unit, but may use a solid state light source, such as an LED, or a lamp, such as a super-high pressure mercury lamp, as the light source unit.

As described above, the light source apparatus according to the invention is suitably used for a projector.

The entire disclosure of Japanese Patent Application No. 2007-006677, filed Jan. 16, 2007 is expressly incorporated by reference herein.

What is claimed is:

1. A light source apparatus comprising:
    a light source unit that supplies light having a first wavelength;
    a wavelength conversion element that converts the light having the first wavelength into the light having a second wavelength different from the first wavelength; and
    a wavelength separator that separates the first-wavelength light from the second-wavelength light;
    an exit through which the light from the wavelength separator traveling in an exit direction passes;
    an infrared light reduction member provided at the position where the light from the wavelength separator traveling in the exit direction impinges on the infrared light reduction member, the infrared light reduction member reducing infrared light transmission; and
    a housing that houses the light source unit, the wavelength conversion element, and the wavelength separator,
    wherein the wavelength separator directs the second-wavelength light from the wavelength conversion element in the exit direction and the first-wavelength light from the wavelength conversion element in a first direction such that the first-wavelength light impinges on the housing, the first direction intersects the light source unit, the wavelength conversion element and the wavelength separator,
    the housing absorbs the first-wavelength light at a position where the light from the wavelength separator traveling in a direction other than the exit direction impinges on the housing,
    the exit direction, which is different than the first direction, intersects the exit, and
    the light source unit supplies infrared light, which is the first-wavelength light.

2. The light source apparatus according to claim 1, wherein the wavelength separator allows the first-wavelength light to pass through in a direction other than the exit direction, and reflects the second-wavelength light in the exit direction.

3. The light source apparatus according to claim 1 further comprising
    a light blocker provided around the exit, the light blocker blocking the light other than that from the wavelength separator traveling in the exit direction.

4. The light source apparatus according to claim 1, wherein the housing has a recess provided at the position where the light from the wavelength separator traveling in a direction other than the exit direction impinges on the housing.

5. The light source apparatus according to claim 3, wherein the light blocker is provided at each end of the exit, the light blocker extending into the housing.

6. The light source apparatus according to claim 1 further comprising a resonator structure in which the first-wavelength light resonates along the light path including the wavelength conversion element,
    wherein the wavelength separator is disposed on the exit side of the resonator structure.

7. A projector comprising:
    the light source apparatus according to claim 1; and
    a spatial light modulation device that modulates the light from the light source apparatus according to an image signal.

8. The light source apparatus according to claim 1, wherein the wavelength separator directs the second-wavelength light in the exit direction that is approximately 90° from the first direction.

9. The light source apparatus according to claim 1, further comprising:
    a resonance structure including a first resonance mirror and a second resonance mirror, wherein
    the wavelength separator is disposed outside of the resonance structure.

* * * * *